Nov. 6, 1956   T. J. CRAWFORD   2,769,886
INDUCTION HEATING AND WELDING
Filed April 20, 1954   3 Sheets-Sheet 1

INVENTOR.
THOMAS J. CRAWFORD
BY
Oberlin & Limbach
ATTORNEYS

INVENTOR.
THOMAS J. CRAWFORD
BY
Oberlin & Limbach
ATTORNEYS

INVENTOR.
THOMAS J. CRAWFORD
BY
Oberlin & Limbach
ATTORNEYS

United States Patent Office

2,769,886
Patented Nov. 6, 1956

2,769,886

INDUCTION HEATING AND WELDING

Thomas J. Crawford, Berkley, Mich.

Application April 20, 1954, Serial No. 424,377

5 Claims. (Cl. 219—8.5)

This invention relates to high frequency induction heating and, more particularly, to improvements in induction tube welders of the type disclosed in my co-pending application, Serial No. 205,511, filed January 11, 1951, and now Patent No. 2,687,464, dated August 24, 1954.

Reference may be had to my noted earlier application for a complete description of the distinguishing characteristics of this type of induction welding apparatus, and it will suffice here to mention only briefly the major components thereof and their operative relationships and effects. Such apparatus is designed for the continuous production of welded tubing from metal strip and comprises a tube mill for advancing the strip while progressively shaping the same to the form of a tubular blank having an open longitudinal seam, a high frequency heating coil through which the blank as thus formed is passed, and a squeeze roll unit operative to force the seam edges of the blank together at a point spaced a predetermined distance beyond the coil.

The point of bringing the seam edges together relative to the inductor is critical and must be spaced axially beyond, but adjacent, the effective limit of the field of the coil so that the current induced thereby in the blank will be caused to flow longitudinally from the region embraced by the coil along the surfaces of the opposed seam edges and across their point of juncture. As more fully explained in my prior disclosure, this produces a concentration of the induced current at the point of edge contact and it is only in the immediate area of this point that the edges are heated to fusion temperature.

Among the many advantages of this apparatus, as strikingly demonstrated by actual production runs, is the high speed of operation possible. For example: low carbon, cold rolled steel strip has been formed and welded at the rate of 66 feet per minute to produce one inch O. D. tubing having a wall thickness of .012"; 3S, half hard aluminum alloy strip has been formed and welded at a rate of 128 feet per minute to produce one inch O. D. tubing having a wall thickness of .051". These and even higher speeds of operation, of course, reduce the period of induced current flow in successive portions of the moving blank, and in order to obtain good quality welds, the shorter heating interval must be compensated by increased current flow and hence greater energy supplied to the induction coil. A vacuum tube oscillator is employed as the source of high frequency energy, and such oscillators are quite expensive, with the cost thereof increasing as the size and rated output increases.

It is among the objects of my invention to effect a substantial savings in equipment costs in this type of apparatus by providing an improved power supply for the induction coil. Another object is to improve the electrical circuitry of such an induction tube welder in a manner which provides the necessary high frequency energy with a relatively low voltage vacuum tube oscillator. It is a further object to provide an induction heating system including a relatively low voltage vacuum tube oscillator modified to make available high frequency energy in amounts considerably greater than obtained in usual operation of such oscillators. Other objects and advantages will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
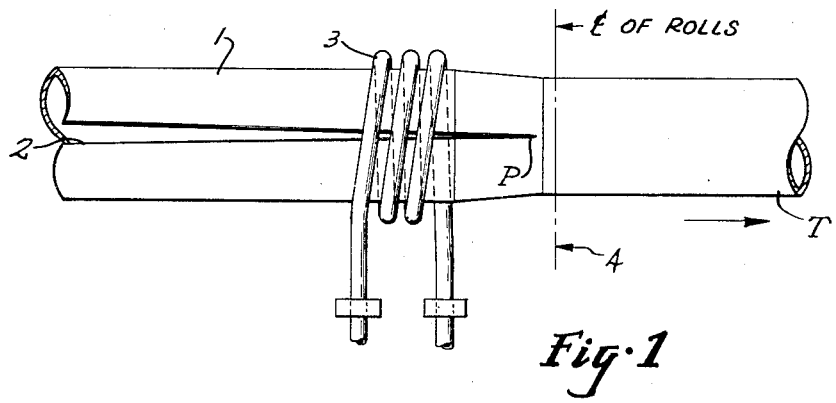
Fig. 1 is a simplified view of a metal blank as shaped and advanced through a high frequency induction coil in a tube welder of the type to which the invention relates.

Referring now to the drawings in detail, the arrangement of work and inductor shown in Fig. 1 is that obtained in an induction tube welder of the type disclosed in my co-pending aplication, Serial No. 205,511 now Patent 2,687,464, and comprising, as noted in the above, a tube mill, an inductor coil, and a squeeze roll unit. The complete structure of the welder has not been illustrated since it is not necessary to an understanding of the present invention, and moreover, may readily be ascertained if desired by referring to my earlier patent.

It will be clear that the continuously moving work is shaped to the form of a tubular blank 1 having an open longitudinal seam 2 therein at the stage of operation in which it passes through the high frequency inductor or heating coil 3. The coil is preferably formed of electrolytic copper tubing and cooled by the circulation of water therethrough. As thus encircled by the coil, the seam is of progressively lesser width and the edges thereof are forced together by the squeeze roll unit at the point P spaced axially beyond the coil. The squeeze rolls, the centerline of which is indicated at 4, are so positioned that the point P is spaced to produce the induced current flow in the seam edges discussed above and set forth in my earlier application. The edges are welded at such point and the blank therebeyond is in the form of the finished welded tubing T.

The power supply for the inductor includes a vacuum tube oscillator 5 having the usual anode 6, grid 7 and cathode 8, with the anode connected through a choke coil 9 to the positive terminal B+ of the plate or anode supply. A shunt capacitor 10 is provided to by-pass any alternating component of the plate supply to ground and grid 7 and cathode 8 are grounded, the former through a grid resistor 11. Connected in the anode circuit, in a manner to be described more in detail hereinbelow, is a tank circuit including an inductance 12 and a bank of parallel capacitors 13, the latter being connected across the ends of the inductance. One end of the tank is grounded, and feed back to the grid circuit is provided by means of the small transformer 14 and blocking capacitor 15 connected to the grid as shown.

The oscillator circuit thus far described is conventional and would normally include a connection between the anode 6 and the ungrounded end of the tank circuit through the blocking capacitor 16. In accordance with the invention, however, the inductance 12 is modified by the provision of taps, two being shown at 17 and 18, intermediate the ends of the coil, thereby to permit the anode to be connected selectively to the upper end or to one of such intermediate taps. In the construction illustrated, the inductance 12 is a nine-turn coil, the tap 17 is connected with the eighth turn, and tap 18 with the seventh turn, with respect to ground. The full line connection 19 extends between the anode and tap 18, while the dotted lines 20 and 21 show the possible alternative connections respectively to tap 17 and to the upper end of the inductance.

With the oscillator anode connected to tap 18, or another intermediate tap, the inductance acts as an auto-transformer, the turns connected directly in the anode circuit at the tap serving as a primary and the complete inductance as the secondary of such auto-transformer. Since this primary has fewer turns than the secondary, a voltage step-up is obtained, and consequently, the voltage across the tank is greater than the normal anode voltage. The available energy is accordingly greater than that provided by the conventional connections, and this energy is supplied to the coil 3 by means of the single turn coil 22 connected therewith and coupled closely with the entire inductance 12 to form an air core or high frequency transformer. The inductance 12, therefore, serves three functions, namely, as the tank inductance, as an auto-transformer providing increased tank voltage, and as the primary of a current transformer used to match the load to the generator.

The auto-transformer action in the tank coil, with the oscillator connected to an intermediate tap, makes it possible to use an oscillator designed to operate at a relatively low anode voltage for load energy requirements which heretofore could be met only by larger and more expensive oscillators. Furthermore, the plurality of taps provides an obvious flexibility in permitting regulation of the amount of voltage step-up to suit best particular operating conditions, which will be variable with changes in the work material and size, desired temperature of heating, speed of the work advance and the like. It is preferable to increase the voltage as set forth rather than to raise the tank current, since the latter would result in increased losses in the tank.

Figure 2:
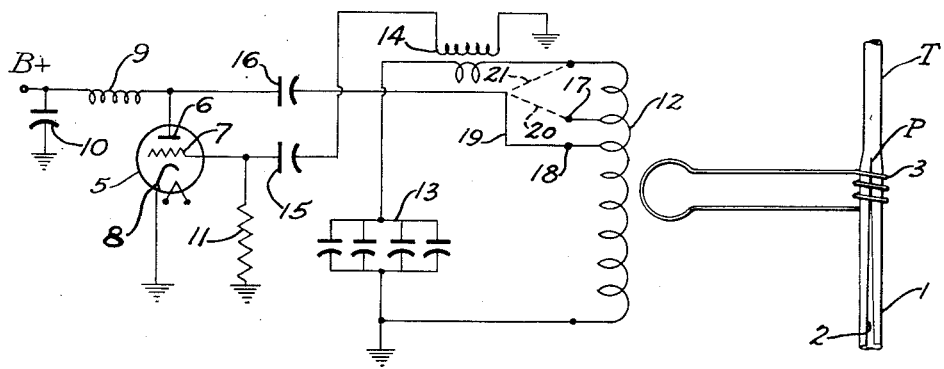
Fig. 2 is a wiring diagram illustrating the circuit of the vacuum tube oscillator used to supply the high frequency energy to the inductor.

As indicated earlier, the present improvements are adapted particularly for use in induction welders such as shown in my application, Serial No. 205,511, now Patent 2,687,464, and tests conducted with a welder of this type may be cited to illustrate the extent to which the operation thereof has been enhanced by modifying the radio-frequency generator in the manner discussed above. In such tests, a commercially available vacuum tube oscillator having a rated power output of 50 kilowatts and designed to operate with an anode voltage of 8500 volts was coupled to a 4 turn induction coil by a current transformer having a 9:1 turns ratio. This current transformer would comprise the inductance 12 and single turn 22 in the circuit of Fig. 2. In order to weld satisfactorily 14S–0 aluminum alloy tubing having 2¾" O. D. and a wall thickness of .072" at a rate of 75 feet per minute with the tube anode connected in the usual manner to the ungrounded end of the transformer primary (the tank inductance), it was necessary to overload the oscillator to an output anode voltage of about 12,600 volts. Under these conditions, the R. F. current was approximately 315 amperes and the anode current was 4.2 amperes. By adding a tap at the seventh turn of the inductance and connecting the anode thereto, all other operating conditions being substantially the same, it was possible to obtain a high quality weld with an anode voltage on the order of 8400 volts. In the latter case, the R. F. current was about 310 amperes and the anode current 4.8 amperes. In both cases, the frequency was in the neighborhood of 400 kc.

The above tests show that the energy required for satisfactory welding at such a high rate can be obtained with much less output anode voltage than normally needed through use of the intermediate tap connection to the tank inductance. Actually, in the second test the oscillator used was operated at about its design value, whereas to obtain comparable welds at the same rate without the auto-transformer effect, it was necessary to overload considerably the available oscillator.

Figure 3:
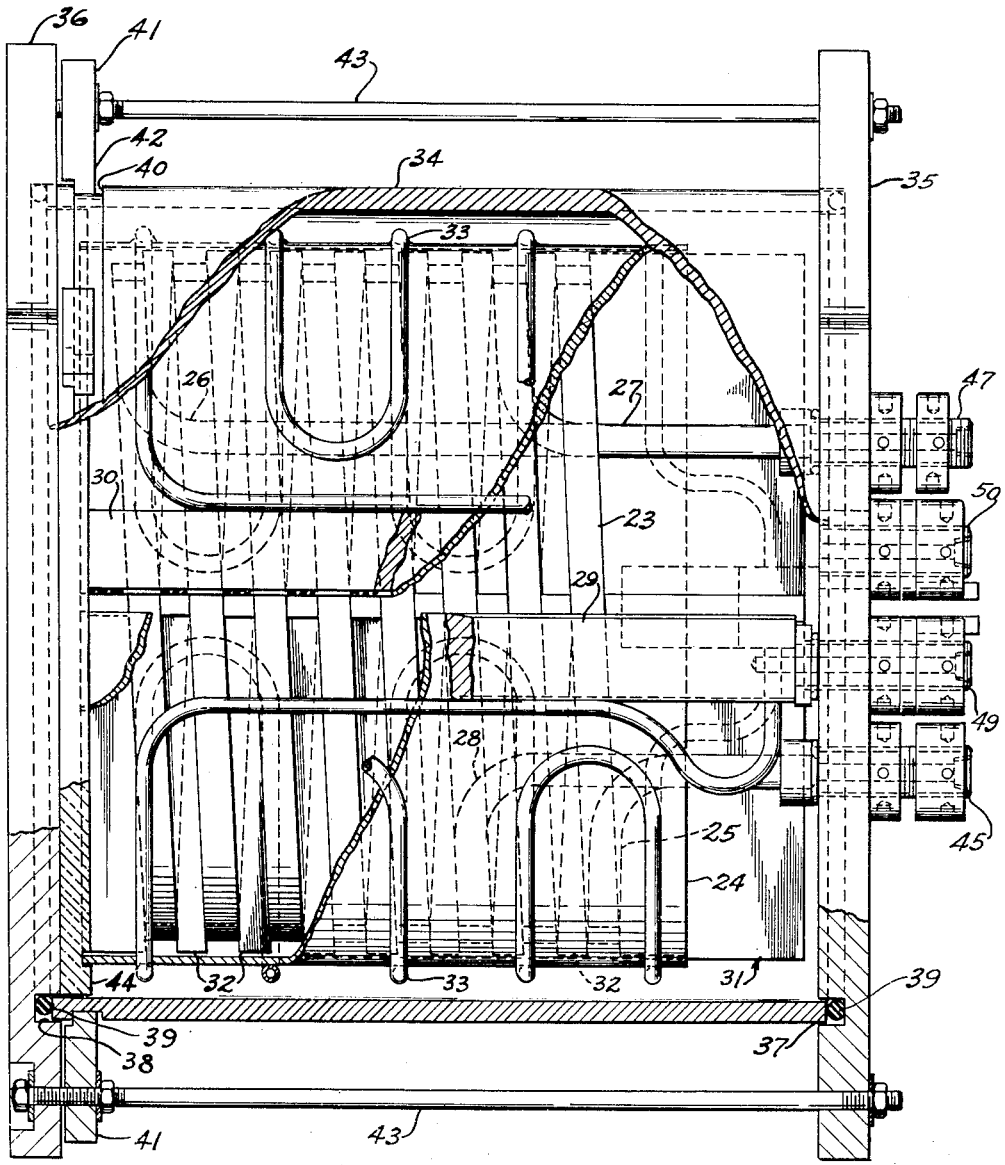
Fig. 3 is an elevational view of a radio-frequency transformer employed in the oscillator circuit, with parts thereof broken away to show the inner structure.
Figure 4:
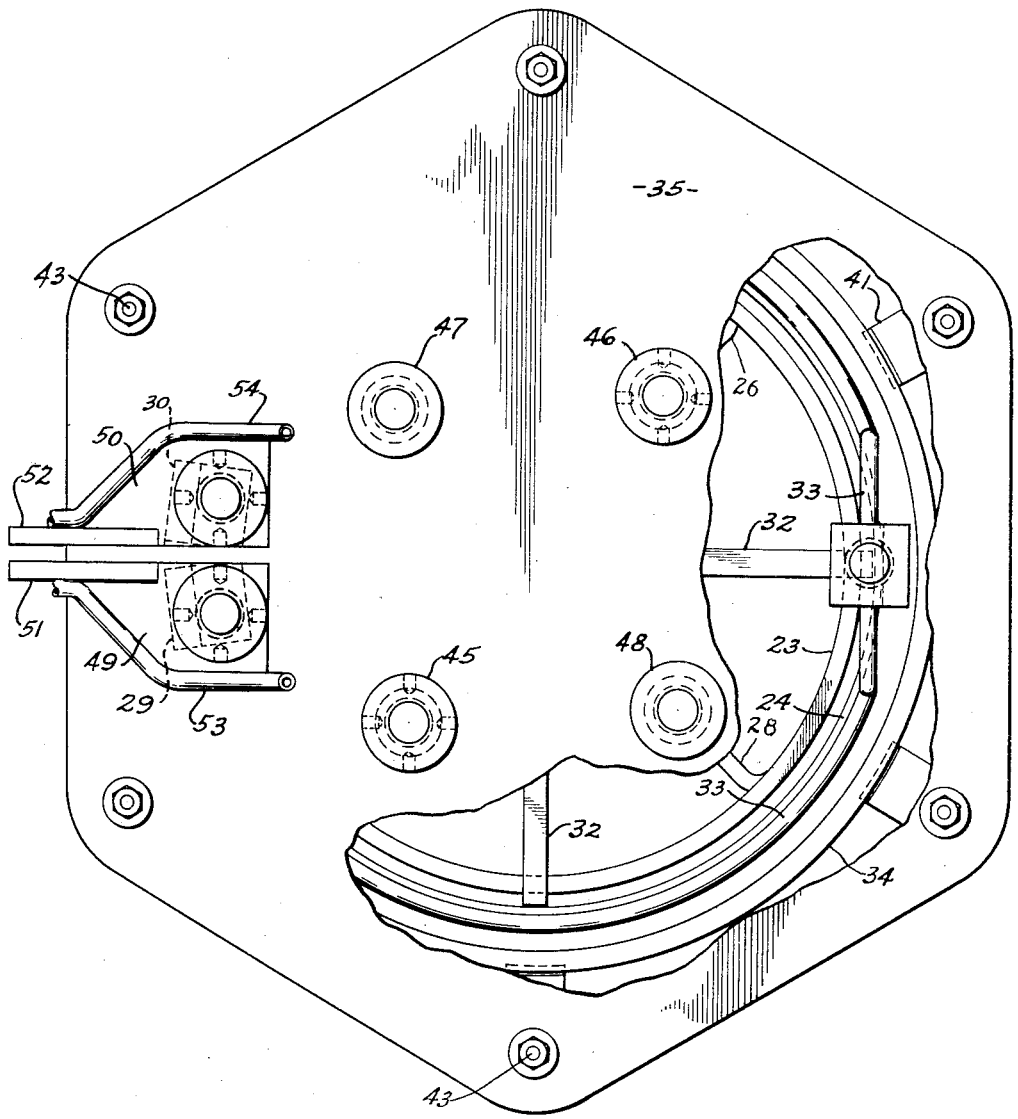
Fig. 4 is a top view of the transformer with its top plate likewise partially broken away.

In Figs. 3 and 4, I have illustrated an air core transformer which has been used in accordance with the present invention to couple the vacuum tube oscillator and the heating coil. This transformer has a nine-turn primary coil 23 of rectangular copper tubing, through which water is circulated for cooling purposes, and a single turn secondary in the form of a split metal cylinder 24 closely surrounding the primary coil. A plurality of taps connect to different points on the primary coil, tap 25 being connected to the top or upper end thereof, tap 26 to the bottom end, and taps 27 and 28, respectively, to the eighth and seventh turns. All these taps lead in the same axial direction and extend beyond the upper coil end. The connections for the secondary 24 are in the form of two copper buses 29 and 30 secured to the outer surface of the split cylinder at the seam edges of the same. A coil spacer 31 having radial arms 32 is disposed centrally of the primary coil and such arms engage between the turns of the coil to maintain them in separated condition. Cooling of the secondary coil is accomplished by circulating water through the tubing 33 disposed sinuously on and secured to the outer surface of the split cylinder.

The primary and secondary coils are enclosed by a housing comprising a cylindrical outer shell 34, a top plate 35, and a bottom plate 36. The top and bottom plates are provided with circular slots 37 and 38, respectively, within which the ends of the shell 34 fit, together with the rings 39 of resilient material. The bottom end portion of the shell has a recess 40 in its outer surface, and a plurality of clamps 41 are spaced thereabout with portions 42 engaging in such shell recess. A number of tie rods 43 are employed to hold the bottom plate, clamps and top plate in axially clamped relation thereby to support the shell 34 firmly between the end plates. A spacer 44 is provided at the bottom of the split cylinder 24 to locate the same within the shell by having the cylinder end fitted in a circular slot in such spacer.

The top plate 35 supports a plurality of terminals connected with the primary coil leads and the secondary buses, whereby the transformer may be connected in the oscillator circuit and to the inductor. Tap 25 thus connects with terminal 45, tap 26 with terminal 46, tap 27 with terminal 47, and tap 28 with terminal 48. Terminal blocks 49 and 50 respectively connect with the secondary buses 29 and 30 and externally with the buses 51 and 52 to which the inductor is concerned. All such terminals are of a type to permit water flow therethrough, and cooling tubes 53 and 54 are provided to cool the secondary terminal blocks and external buses.

In the use of this transformer, the inductor is connected as indicated to the two secondary terminals 51 and 52, the capacitance, which together with the primary coil 23 constitutes the tank circuit of the oscillator, is connected to the top and bottom terminals 45 and 46, respectively, and the tube anode is connected either to the top of the primary coil at the terminal 45 or to one of the alternate taps at terminals 47 and 48. It will be understood that the auto-transformer effect described previously will obtain only when one of the intermediate taps is used. The transformer is, of course, operative in the manner described with the primary winding serving the three functions noted in those cases where the anode is connected to an intermediate tap.

While the invention has been described primarily with reference to induction welders of the nature shown in my copending application Serial No. 205,511, now Patent 2,687,464, it will be appreciated that the principles may also be used to advantage in other types of induction heating apparatus. All such apparatus is characterized by a very poor load power factor due to the inductive character of the load, and therefore, requires considerable reactive power to be supplied. This disadvantage has been greatly emphasized by the improvements in induction welders as set forth in my noted co-pending application, since the much higher rates of operation made possible thereby created a demand for an oscillator of normal type of considerably larger size than heretofore used in induction heating and welding apparatus. This problem, but for the present invention, could be met only by dangerously overloading the available equipment or by the construction of higher power oscillators. However, the improved power supply system I have disclosed herein eliminates such inadvisable and expensive steps by permitting the use of what may be considered a relatively low voltage oscillator and yet providing sufficient output energy to obtain good welding at high rates of production.

Reference may also be had to certain other of my co-pending applications, namely, Serial No. 320,201, filed November 13, 1952; Serial No. 385,735, filed October 13, 1953; and Serial No. 340,837, filed March 6, 1953, now Patent No. 2,687,464, dated August 24, 1954, where additional improvements likewise relating to this type of induction welding are disclosed.

Other modes of applying the principle of the invention may be employed, change being made as regards the details described, provided the features stated in any of the following claims, or the equivalent of such, be employed.

I therefore particularly point out and distinctly claim as my invention:

1. In apparatus for the production of welded tubing from a tubular blank having an open longitudinal seam, which apparatus includes a heating coil adapted to have such blank moved therethrough and means adapted to force the opposed edges of such seam together at a point spaced beyond but adjacent the effective field of the coil; the improvement comprising a radio-frequency transformer having a primary inductance of a predetermined number of turns and a single turn secondary in the form of a closely coupled split metal cylinder, means connecting said coil to such single turn secondary so as to be supplied energy by said transformer, a plurality of taps respectively on separate turns of such inductance intermediate the ends thereof, a capacitance connected across the predetermined number of turns of such inductance to form a tuned circuit therewith, a tube oscillator, and means connecting such tuned circuit in the anode circuit of said oscillator including a connection through a blocking condenser between the oscillator anode and one of said taps on the inductance, the voltage across the tuned circuit thereby being greater than the normal oscillator anode voltage due to step-up auto-transformer effect in such inductance, whereby the energy supplied to the coil is greater than that normally obtainable from the tuned circuit when an end of the inductance is connected through the blocking condenser directly to the oscillator anode.

2. In apparatus for the production of welded tubing from a tubular blank having an open longitudinal seam, which apparatus includes a heating coil adapted to have such blank moved therethrough and means adapted to force the opposed edges of such seam together at a point spaced beyond but adjacent the effective field of the coil; the improvement comprising a radio-frequency transformer having a primary inductance of a predetermined number of turns and a secondary to which said coil is connected, a capacitance connected across the predetermined number of turns of such inductance to form a tuned circuit therewith, a tube oscillator, and means connecting such tuned circuit in the anode circuit of said oscillator including a connection between the oscillator anode and a point on such inductance intermediate the points on the latter at which said capacitance is connected, whereby the voltage across the tuned circuit is greater than the normal oscillator anode voltage due to step-up auto-transformer effect in such inductance and thus greater energy is supplied to the coil than provided when the oscillator anode is connected to an end of the inductance.

3. Induction heating apparatus comprising a radio-frequency transformer having a primary inductance of a predetermined number of turns and a single turn secondary, a heating coil connected to such secondary and adapted to encircle the work to be heated, a plurality of taps respectively on separate turns of such inductance intermediate the ends thereof, a capacitance connected across the predetermined number of turns of such inductance to form a tuned circuit therewith, a tube oscillator, and means connecting such tuned circuit in the anode circuit of said oscillator including a connection between the oscillator anode and one of said taps on the inductance, the voltage across the tuned circuit thereby being greater than the oscillator anode voltage due to step-up auto-transformer effect in such inductance in an amount dependent on the number of turns connected at such one tap, whereby the energy supplied to the induction coil is greater than that normally obtained when an end of the inductance is connected directly to the oscillator anode.

4. Induction heating apparatus comprising a radio-frequency transformer having a primary inductance of a predetermined number of turns and a secondary to which a heating coil is connected, a capacitance connected across the predetermined number of turns of such inductance to form a tuned circuit therewith, a tube oscillator, and means connecting such tuned circuit in the anode circuit of said oscillator including a connection between the oscillator anode and a point on such inductance intermediate the points of the latter at which said capacitance is connected, whereby the voltage across the tuned circuit is greater than the normal oscillator anode voltage due to step-up auto-transformer effect in such inductance and thus greater energy is supplied to the coil than provided when the oscillator anode is connected to an end of the inductance.

5. Induction heating apparatus comprising an oscillator, a high-frequency transformer, a capacitance connected across a predetermined number of turns of the primary inductance of said transformer to form a resonant circuit therewith, circuit means for applying the output of said oscillator across a portion of the primary inductance included within that portion thereof bridged by said capacitance, and a high-frequency work inductor supplied with energy from the secondary circuit of said transformer.

References Cited in the file of this patent

UNITED STATES PATENTS

| | | |
|---|---|---|
| 2,622,542 | Bonanno | Dec. 23, 1952 |
| 2,623,176 | Witsenburg et al. | Dec. 23, 1952 |
| 2,625,637 | Garner et al. | Jan. 13, 1953 |

FOREIGN PATENTS

| | | |
|---|---|---|
| 377,655 | Great Britain | Jan. 21, 1931 |